G. H. TAYLOR.
SHEARS AND SCISSORS.
No. 180,675.  Patented Aug. 1, 1876.
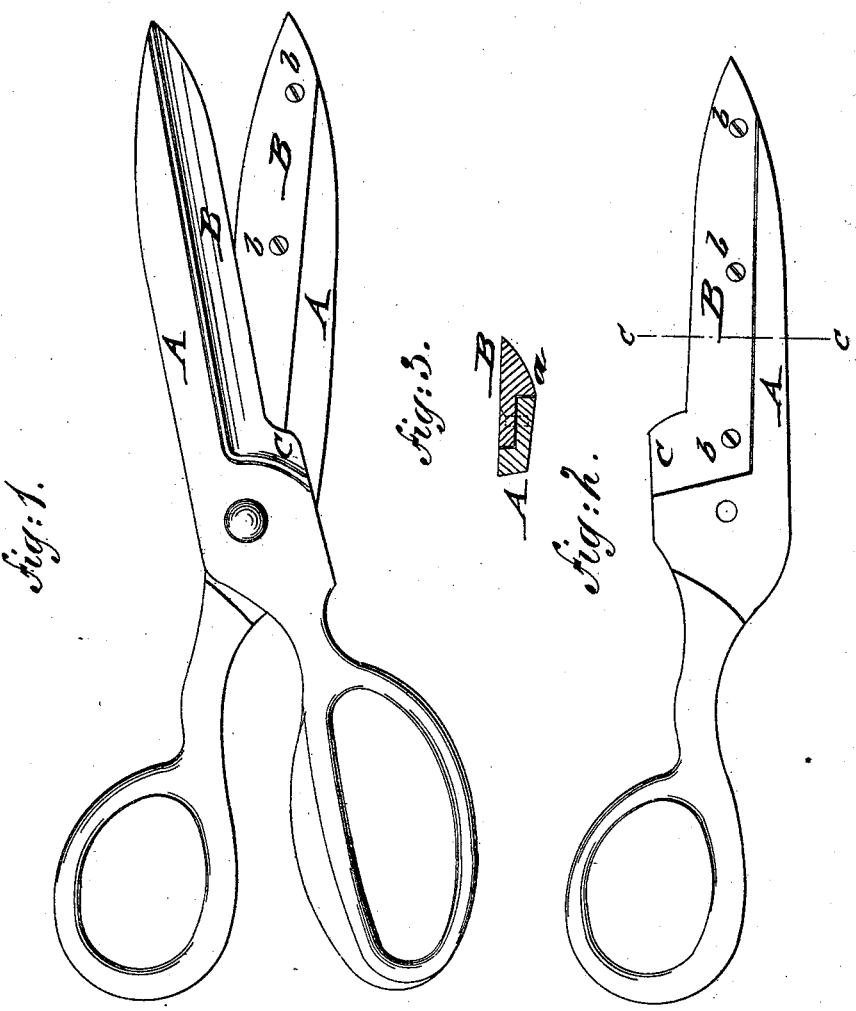

UNITED STATES PATENT OFFICE.

GEORGE H. TAYLOR, OF NEW YORK, N. Y.

IMPROVEMENT IN SHEARS AND SCISSORS.

Specification forming part of Letters Patent No. 180,675, dated August 1, 1876; application filed May 5, 1876.

*To all whom it may concern:*

Be it known that I, GEORGE H. TAYLOR, of the city, county, and State of New York, have invented a new and Improved Shear and Scissor, of which the following is a specification:

In the accompanying drawing, Figure 1 represents a top view of my improved shear; Fig. 2, a top view of shear-section detached, and Fig. 3 a vertical transverse section of the same on line $c\,c$, Fig. 2.

Similar letters of reference indicate corresponding parts.

The object of my invention is to so improve the shears and scissors in common use that they may be serviceable for any length of time, and be more effective and convenient in use.

The invention consists in constructing shear or scissor blades with a curved shoulder or extension at the rear end of the cutting-edge of the blades, to adapt them for use in ripping goods.

In the drawing, A A are the stocks of shears or scissors provided with detachable cutting-blades B, which have shoulders $a$, and are secured to the stocks by two or more fastening-screws, $b$. The rear ends of the blades B are provided with curved extensions C, for facilitating ripping of goods. The joint action of the extensions produces easy ripping of the goods by holding the shears sufficiently open to admit their contact with the fabric.

What I claim as new is—

Shears or scissors having the cutting-edges of their blades provided with the curved extensions C, to form a ripping-cutter, as shown and described.

GEORGE H. TAYLOR.

Witnesses:
PAUL GOEPEL,
JAMES H. HUNTER.